United States Patent [19]

Seeger et al.

[11] 3,931,113

[45] Jan. 6, 1976

[54] IMPACT-RESISTANT THERMOPLASTIC POLYESTER URETHANES

[75] Inventors: Nelson V. Seeger, Cuyahoga Falls; Andrew J. Kaman, Norton, both of Ohio

[73] Assignee: PPG Industries, Inc., Pittsburgh, Pa.

[22] Filed: Nov. 30, 1972

[21] Appl. No.: 311,043

Related U.S. Application Data

[63] Continuation-in-part of Ser. No. 154,944, June 21, 1971, abandoned.

[52] U.S. Cl. .................... 260/75 NT; 260/75 NP; 260/77.5 AN; 260/77.5 NT; 296/84; 428/425

[51] Int. Cl.² .................. C08G 18/75; C08G 18/42

[58] Field of Search .. 260/75 NP, 75 NH, 77.5 AM, 260/77.5 AN, 77.5 AT, 75 NT

[56] References Cited
UNITED STATES PATENTS

| | | | |
|---|---|---|---|
| 3,523,101 | 8/1970 | Reuter | 260/47 |
| 3,591,561 | 7/1971 | Kazama et al. | 260/2.5 AN |
| 3,620,905 | 11/1971 | Ahramjian | 260/75 NP X |
| 3,711,440 | 1/1973 | Chadwick | 260/75 NP X |
| 3,755,262 | 8/1973 | Slagel | 260/77.5 AM |
| 3,764,457 | 10/1973 | Chang et al. | 260/77.5 AP X |
| 3,766,148 | 10/1973 | Taub | 260/75 NH X |
| 3,823,060 | 7/1974 | McClung et al. | 260/77.5 AT |

FOREIGN PATENTS OR APPLICATIONS 6,916,948   7/1970   Netherlands

*Primary Examiner*—H. S. Cockeram
*Attorney, Agent, or Firm*—Irwin M. Stein

[57] ABSTRACT

Polyester urethanes having superior properties for use in safety glass windshields are formed from (a) a hydroxy-terminated polyester of polycaprolactone, poly(butylene adipate), poly(butylene azelate) or mixtures; (b) a diol having a molecular weight less than 250, preferably 1,4-butanediol or 1,3-butanediol and (c) a cycloaliphatic diisocyanate.

16 Claims, No Drawings

IMPACT-RESISTANT THERMOPLASTIC POLYESTER URETHANES

CROSS-REFERENCE TO RELATED APPLICATIONS

This application is a continuation-in-part application of our earlier application Ser. No. 154,944, filed June 21, 1971, now abandoned.

This invention relates to polyester-urethanes having superior properties for use in preparing safety glass and particularly polyester-urethanes formed from (a) a polyester of polycaprolactone, poly(butylene adipate), poly(butylene azelate) or mixtures; (b) a diol with a molecular weight less than 250 and preferably 1,4-butanediol or 1,3-butanediol; and (c) a cycloaliphatic diisocyanate.

Safety glass is a well-known term for a glass sandwich composed of an interlayer bonding together two glass plates or sheets which when broken results in a minimum dispersion of fragments of broken glass. Recently it has been discovered that a plastic material can be adhered to a single sheet of glass to make an impact-resistant bilayer and the compositions of the invention are suitable for both bilayers and the conventional trilayer safety glass laminates although the ratios may vary in which the ingredients are reacted to form the polyester-urethanes and the thickness of the polyester-urethane may differ depending upon which type of laminate is desired.

The concept of employing a polyester-urethane as an interlayer for safety glass laminates is not new. It has been found, however, that the compositions of the invention give superior impact-resistance, are energy absorbing such that concussive injury is minimized when employed in a safety glass laminate and are resistant to hydrolytic and ultraviolet degradation when employed in a bilayer safety glass laminate.

The poly(butylene adipate) or poly(butylene azelate) polyester component which is employed to form the polyester-urethane of the invention is formed from butanediols preferably 1,4-butanediol; and adipic or azelaic acids to provide a molecular weight between about 750 and about 5,000 but preferably between about 1,000 and about 3,000. Polybutylene adipates useful in the invention having molecular weights between about 1,000 and about 2,000 are commercially available. The butanediols reacted with the polyester can be the 1,4- or 1,3-isomer but the particular one used will depend upon the diisocyanate and its isomer ratio. That is, some of the diisocyanates are not compatible with 1,4-butanediol in that translucent urethanes result and for these compositions 1,3-butanediol will be employed. Generally, however, 1,4-butanediol will be suitable and is preferred. Polycaprolactone, the other suitable polyester, can be formed from epsilon caprolactone by well-known procedures to provide a polyester in the aforesaid molecular weight range. The polyesters are hydroxyl terminated.

The diisocyanate which is employed to make the polyester-urethane is a cycloaliphatic compound and preferably a dinuclear compound bridged by an isopropylidene group or an alkylene group of 1 to 3 carbon atoms. Among the diisocyanates which can be employed are 4,4'-methylene-bis-(cyclohexyl diisocyanate), hydrogenated toluene diisocyanate, 4,4'-isopropylidene-bis-(cyclohexyl isocyanate), 1,4-cyclohexyl diisocyanate, 4,4'-dicyclohexyl diisocyanate, 2,2,4-trimethylhexamethylene diisocyanate (TMDI); and 3-isocyanato methyl-3,5,5-trimethylcyclohexyl diisocyanate (IPDI). Mixtures can be employed to include minor amounts of other diisocyanates, such as toluene diisocyanate, diphenyl methane diisocyanate (MDI) and other aromatic diisocyanates providing that the amount employed is carefully controlled to avoid yellowing, translucence, and reduced impact resistance.

The most preferred cycloaliphatic diisocyanate is 4,4'-methylene-bis-(cyclohexyl isocyanate) and is commerically available in different stereoisomer ratios. The product sold by duPont Company under the trademark "Hylene W" has a stereoisomer content of 19 to 21 percent trans, trans, 17 to 18 percent cis, cis, and 62 to 64 percent cis, trans. The total ratio is 55 percent trans and 45 percent cis. The diisocyanate may also contain a minor amount of monoisocyanate such as between about 0.27 and 0.40 percent and has a total acidity (as HCl) between about 0.001 and 0.002 percent by weight and an isocyanate content of about 99.8 percent of the theoretical. In the most preferred compositions of the invention, the diol reacted with this diisocyanate and polyester is 1,4-butanediol. The same diisocyanate has also been offered commercially by Allied Chemical Company as "Nacconate H-12" but in a different stereoisomer ratio of 70 percent total trans, and 30 percent total cis (the proportion which is cis, cis; trans, trans and cis, trans is not known). With this diisocyanate, the diol which is reacted with the polyester and diisocyanate should be 1,3-butanediol or other unsymmetrical or branched diol or a translucent product is likely to result. Thus, when the total ratio of trans to cis is high, a branched or unsymmetrical diol such as 1,3-butanediol should be employed to avoid the formation of translucent urethanes although they may have exceptional impact-resistant and other properties necessary for superior safety glass.

In addition to the most preferred butanediols, other low molecular weight diols with molecular weights less than 250 can be employed including aliphatic diols of from 2 to 10 carbon atoms with or without ether or ester linkages as well as cycloaliphatic diols. Exemplary of suitable aliphatic diols are 1,2-propanediol; 2-methyl-2-ethyl-1,3-propanediol; (2,2,4-trimethyl-1,3-pentanediol); 2-methylbutanediol-1,4; 2-butyl-2-ethyl-propanediol-1,3; 1,5-pentanediol; and 1,6-hexanediol. Exemplary of suitable diols with ether linkages are diethylene glycol, triethylene glycol, tetraethylene glycol and dipropylene glycol. Exemplary of suitable cycloaliphatic diols are 1,4-cyclohexanedimethanol; 1,4-cyclohexanediol; 2,2,4,4-tetramethyl-1,3-cyclobutanediol; and 4,4'-isopropylidene-bis-(cyclohexanediol). Exemplary of suitable diols with ester linkages are hydroxypivalyl hydroxypivalate, bis-hydroxyethyl adipate and bis-hydroxypropylene adipate.

To obtain optically clear plastomers, it is generally necessary that the monomeric diol be symmetrical when the diisocyanate is low in trans, trans isomer content such as less than about 30 percent. Exemplary of symmetrical diols are 1,4-butanediol, ethylene glycol, 1,2-propanediol, bis-hydroxyethyl adipate and bis-hydroxypropylene adipate. Illustrative of unsymmetrical diols are 1,3-butanediol, 2,2,4-trimethyl-1,3-pentanediol, 2-methyl-2-ethyl-1,3-propanediol, 2-methylbutanediol-1,4, 2-butyl-2-ethyl-propanediol-1,3, and hydroxypivalyl hydroxypivalate. The low molecular weight diols are preferably saturated but unsaturated diols can be employed such as 2-butene-1,4-diol. For convenience, much of the disclosure refers to 1,4-butanediol. It should be understood, however, that the other monomeric diols can generally be substituted depending upon the isomer ratio of the diisocyanate.

The reactants are essentially linear and the resultant polyester-urethane is believed to be essentially linear because of its thermoplastic nature and solubility in solvents such as chloroform and N-methyl-2-pyrrolidone.

For interlayers having the best impact energy absorption level, it is important to form the polyurethane from proper proportions of these substituents. Other things being substantially unchanged, it has been discovered that the best interlayer materials are obtained when the ratio of butanediol to polyester, e.g., poly(1,4-butylene adipate) is controlled within certain limits, which limits have been observed to vary depending upon the molecular weight of the polyester.

Thus, when the polyester has a molecular weight of about 1,000 superior interlayer compositions have resulted by the use of between 0.9 and 1.2 moles of butanediol per mole of polyester. When the ratio of butanediol to polyester exceeds about 1.2:1, loss of optimum performance in safety glass application is noted when the laminate is at a temperature of 0°F. because the interlayer is brittle. Brittle interlayers are undesirable because there is little diaphragm action when the laminate is ruptured thereby increasing the likelihood of concussive, lacerative, and penetration injury. Within the aforesaid ratios, however, the compositions are superior to all known interlayer compositions as the penetration resistance is superior over a broad temperature range of from 0°F. to 120°F. Heretofore, it has been only possible to prepare laminates which were effective at a particular temperature and when variations were made to improve another temperature, the properties of a laminate at the first temperature suffered.

Quite surprisingly, it has been found that when the polyester has a molecular weight of 2,000, the ratio of ingredients can be considerably expanded and superior compositions still prepared. For example, the ratio of butanediol to polyester of 2,000 molecular weight can be between about 0.7:1 and about 5:1 and the laminate has superior properties across a wide temperature range.

To prepare a transparent polyester-urethane suitable for use in automobile wind-shields, it is necessary that the urethane reactants be made homogeneous and reacted at a temperature above about 100°C, or preferably above about 120°C. In some cases, however, additional steps are necessary in order to obtain haze free interlayer polymers. For example, some compositions made from high molecular weight polyesters such as 4,000 molecular weight poly(1,4-butylene adipate) are translucent unless the reaction rate of the reactants is controlled to obtain a more random distribution of blocks of diisocyanate-polyester, and diisocyanate-diol having a molecular weight less than 250, such as by use of a catalyst or by mixing and/or conducting the reaction at a higher temperature. One method to clarify these polymers is to heat the polymer to a temperature between about 320°F. and about 375°F. such as by extrusion and then quench it in water, although in some cases the polymer may revert to its translucent state upon aging. As previously noted, the urethane may also become translucent because of the use of a diisocyanate having a high amount (70%) trans isomer but this can be compensated for by using the unsymmetrical 1,3-butanediol.

It is also important to rapidly obtain reaction temperatures after a homogenous mixture is obtained when a catalyst is not employed so that the polymer does not become hazy. For example, it has been found that when poly(1,4-butylene adipate), 1,4-butanediol, and 4,4'-methylene-bis-(cyclohexyl diisocyanate) "Hylene W" are employed in the mole ratio of Example 3, infra, the mixture becomes hazy after about 103 minutes at a temperature of 65°C. When the temperature is raised to 80°C., however, the mixture becomes hazy after about 47 minutes and when the temperature is further raised to 100°C., after a twenty minute heating period from 57°C., the mixture is hazy after only sixteen minutes at 100°C. Thus, it is important either through the use of a catalyst or by introducing the reactants at the reaction temperature such as by use of a mixing head, to rapidly reach the reaction temperature such as above about 120°C. so that the polymer does not become hazy.

The urethane ingredients are preferably mixed in a moisture-free atmosphere such as nitrogen to prevent moisture contamination. When the reaction is conducted without a catalyst, an oxygen-free atmosphere is also preferably employed to prevent any surface discoloration of the urethane.

The urethanes are preferably prepared by the one-step bulk polymerization method which provides a flexible polymer having a more random distribution of segments. The total number of hydroxyl groups or labile hydrogen atoms is equivalent to the number of isocyanate groups although a slight deficiency of hydroxyl groups or NCO groups can be employed to provide an NCO to OH ratio of 0.99 to 1.01.

The reaction is preferably conducted until the polymer formation is essentially complete and the product is substantially free of unreacted isocyanate groups, i.e., has less than 0.3 percent by weight isocyanate groups and preferably less than about 0.08 percent by weight isocyanate groups. The polyester and butanediol should not have a water content higher than about 0.2 percent, preferably less than 0.05.

To obtain the randomness desired and a clear leathery polymer, the butanediol is preferably added to the polyester under a nitrogen atmosphere to exclude moisture and the temperature maintained sufficiently high so that there is no phase separation and a homogeneous mixture is obtained. The diisocyanate is then preferably added rapidly and the temperature of the mixture maintained sufficiently high to obtain a homogeneous mixture so that there is no phase separation.

The mixture is then preferably degassed with agitation for a period, for example, of about 3 minutes during which time the pressure is reduced from atmospheric to about 3 millimeters of mercury. The reduction in pressure facilitates the removal of the dissolved gases such as nitrogen and carbon dioxide and then the ingredients are preferably reacted at a temperature of between about 120° and 150°C. (e.g., 143°C) if in the pressure of a catalyst and the reaction continued for about 4 hours until there are substantially no isocyanate groups. In lieu of a catalyst, the reaction can be conducted for about 20 hours preferably under a nitrogen atmosphere. The resultant semi-solid polymer is then preferably cut while warm, granulated, extruded and/or milled and calendered into sheets and assembled into laminates.

Polymers having the desired random distribution can also be prepared by the pre-polymer method whereby the polyester is first treated with the diisocyanate and the butanediol is then reacted with the pre-polymer.

If desired, a minor portion of the polyester can be replaced by other polymeric components providing that their use does not result in decreased performance of the resultant laminate. Exemplary of suitable polymers are polyethers such as the poly(oxy-polymethylene) glycols, such as disclosed in Wismer, U.S. Pat. No. 3,509,015, and the hydroxy-terminated polycarbonates as disclosed in Stevens, U.S. Pat. Nos. 3,248,414; 3,248,415; and 3,248,416. Other polyols can also be employed.

After the reaction is substantially complete, the polymer is preferably transferred directly to an extruder and extruded, and/or milled and calendered to the desired thickness or the partially polymerized material can be further polymerized in the forming equipment. When it is not possible to make a direct transfer from the reaction apparatus to the forming apparatus, the polyurethane material can be poured into trays and the like and allowed to harden into blocks. The trays are preferably coated with a suitable coating so that the polymer does not adhere to the tray or removal is sometimes difficult. Suitable coating materials are halogenated hydrocarbons such as Teflon, or a sheet material such as Tedlar can be draped in the tray. Conventional granulators, rubber mills and extruders can be employed to form the polymer into sheet form. The material is then preferably sandwiched between a non-adherent protective material such as polyethylene to exclude dust and preferably sealed in a container to exclude moisture. It may be desirable to coat the polymer with a powder such as sodium bicarbonate in order to prevent adjacent sheets from adhering to each other. Before use in a laminate it is desirable to control the moisture content in the polymer such as by drying in an oven at a temperature between about room temperature and about 120°F. for from a few hours up to 3 days or more. Before lamination the powder, if employed, can be removed by a water bath and the sheet dried. The polyurethane can then be placed with other materials to form the desired laminate. In some cases, an adhesion promoter or inhibitor may be necessary so that the polyurethane adheres to the glass to prevent the scattering or flying of glass pieces when the laminate is ruptured but which does not adhere so tightly that diaphragm action is not obtained when the laminate is ruptured. Suitable adhesion promoters are the alkoxy silanes which include gamma-aminopropyltriethoxysilane (sold by Union Carbide Corporation under the trademark "A-1100") and N-(beta-aminoethyl)-gamma-aminopropyltrimethoxysilane (sold by Union Carbide Corporation under the trademark "A-1120"). The promoter may be incorporated into the urethane reactants, applied externally to the sheet material or applied to the glass surface. Exemplary of suitable adhesion inhibitors are the alkyl acid phosphates disclosed in Canadian Pat. No. 861,469. Particularly preferred is stearyl acid phosphate. Only a minor amount of adhesion controlling agent is required, if at all, such as from about 0.00001 to to about 0.1 percent.

After the desired plies have been assembled, air can be removed and the laminate edges sealed by placing a rubber dam or channel around the edges of the laminate, and pulling a partial vacuum and heating the laminate to the polyurethane softening temperature. Sealing can be accomplished in from between about 5 to 10 minutes at a temperature of 300°F. and pressure of 10-25 p.s.i.g. The laminate can then be placed in an oil or an air autoclave until the laminate is sealed at a temperature between about 275° and 350°F. for a period between about 45 minutes and 2 hours at 50 to 250 p.s.i.g. The autoclave conditions, however, will depend upon the particular polymers employed. In lieu of edge sealing and/or when the polyurethane is adhered to a single layer of glass and thus will be exposed to the oil in the autoclave, the laminate can be placed in a heat-resistant, heat-sealable bag such as a polyethylene coated Mylar bag sold under the trademark "Polymar". The air can then be removed by pulling the vacuum which seals the bag and the edge sealing step eliminated.

A method for preparing trilayer and bilayer laminates useful herein is disclosed in Seeger et al., U.S. Ser. No. 242,347, filed Apr. 10, 1972, pages 39 through 46.

Conventional glass can be employed but preferably the glass is a chemically strengthened or thermally tempered glass.

The following examples serve to illustrate the invention and its preferred embodiments. All parts and percentages in said examples and elsewhere in the specification and claims are by weight unless otherwise indicated.

The compositions of Examples 1 and 2 were prepared and formulated into laminates by the following procedure. A glass kettle was employed, generally 2 liters, fitted with magnetic stirrer, a heating mantle, thermometer, a conduit for reducing the pressure in the kettle and also for introducing nitrogen and an emergency conduit for bleeding air through a drying tube. The polyester was charged to the kettle and heated to a mixing temperature of 160° to 165°F. This mixing temperature was maintained for approximately 1 hour under a reduced pressure of 2 of 3 millimeters of mercury. The low molecular weight diol and diisocyanate were heated in separate containers to the aforesaid mix temperature under a reduced pressure of 2 to 3 millimeters of mercury. The vacuum was broken with the addition of nitrogen and the low molecular weight diol (i.e., less than 250) added to the glass kettle and the pressure reduced to between 2 to 3 millimeters of mercury whereupon the mix temperature of 160° to 165° F. was maintained from 5 to 10 minutes. The diisocyanate was then removed from the oven and added to the glass kettle by the same procedure of the low molecular weight diol and for an additional 5 to 6 minutes the aforesaid mix temperature was maintained. The mixture was then cast into pre-heated glass cells which were pre-heated to a cure temperature of 290°F. and the cells put back in an oven for 24 hours and maintained at 290°F. The cells were prepared by sealing three edges of a ⅛th inch by 12 inch sheet of glass with a silicone gasket or pressure-sensitive spacer tape such as polyvinylchloride with adhesive on each side and this sheet adhered to a similar sheet of glass, and tape applied to three outer edges of said combined sheets whereby s 30 mil space is obtained between the sheets, and three of the four outside edges are sealed. An aluminum tape with adhesive on one side was used to make a dam on the other edge of the glass through which the hot polymer reactants could be poured. The cell was tilted at an angle of 20° to 30° to permit the flow of reactants mix while pushing the air out of the cell and the mixture was poured into the cell and placed in an oven at the same angle. When the polyurethane was cured (e.g., 24 hours at 143°C.) such as determined by the disappearance of the NCO band as evidenced by attentuated total reflectance (infra red spectrophotometry) the laminate of a cell was aged for a week at room temperature and then subjected to an impact test. By this test, a 5 pound steel ball is dropped on to the laminate, while held rigid in a frame, from a heighth which ensures it will penetrate the laminate. By an electronic device, a time-distance reltionship (velocity) is obtained for the ball as it penetrates the laminate; and this data along with knowing the drop heighth permits calculation of the penetration velocity. Several tests were conducted at each temperature and the mean penetration velocity given is the average value obtained from a number of tests, when a single value is given.

$$Wu = \frac{(Y+1)118}{Y MD + (Y+1) Mi + Mp} \times 100$$

$MD$ = Molecular weight of diol
$Mi$ = Molecular weight of diisocyanate
$Mp$ = Molecular weight of polyol
$Y$ = Moles of short chain diol where $Wu$ = weight percent of urethane group. From the results reported in Table I, it can be seen that all of the laminates employing polyethylene adipate as the polyester were brittle 0°F. indicating that the laminate had little or no impact-absorbing properties at this temperature. Compounds I-A, 1-B, 1-C and 1-D, however, all prepared from poly(1,4-butylene azelate) are effective at all three temperatures. Compound 1-B, however, also employing 1,4-butanediol as the low molecular weight diol is superior as it shows the same high impact-absorbing properties at all three temperatures.

TABLE I

| Compound No. Ingredients | 1-A | 1-B | 1-C | 1-D (MOLE RATIO) | 1-E | 1-F | 1-G | 1-H* |
|---|---|---|---|---|---|---|---|---|
| Poly(1,4-butylene azelate) (1908 MW) | 1.00 | 1.00 | 1.00 | 1.00 | — | — | — | — |
| Poly(ethylene adipate) (2029 MW) | — | — | — | — | 1.00 | 1.00 | 1.00 | 1.00 |
| Ethylene Glycol | 3.22 | — | — | — | 3.50 | — | — | — |
| 1,4-Butane diol | — | 3.44 | — | — | — | 3.74 | — | — |
| 1,5-Pentane diol | — | — | 3.56 | — | — | — | 3.87 | — |
| 1,6-Hexane diol | — | — | — | 3.69 | — | — | — | 4.01 |
| Hylene W | 4.22 | 4.44 | 4.56 | 4.69 | 4.50 | 4.74 | 4.87 | 5.01 |

Mean Penetration Velocity (Miles per Hour)
12" × 12" Laminates, Air Clamp, 5 lb. Ball, Corrected to .030"

| | | | | | | | | |
|---|---|---|---|---|---|---|---|---|
| 0°F. | 22.5 | 24.5 | 23.5 | — | Brittle | Brittle | Brittle | Brittle |
| 70°F. | 23.0 | 24.5 | 23.0 | 23.0 | 23.0 | 21.0 | 22.5 | 20.5 |
| 120°F. | 18.5 | 24.0 | 18.0 | 18.0 | 18.0 | 20.5 | 18.0 | 17.0 |

*Interlayer had moderate haze which formed early during oven cure.

EXAMPLE 1

Polyester-urethanes were prepared employing either poly(1,4-butylene azelate) or poly(ethylene adipate) as the polyester with varying low molecular diols and the Hylene W diisocyanate. The ingredients, their mole ratio and the ball drop results are given in the following Table I. All compounds were formulated to provide a urethane content of 15.5 percent and three laminates were tested at 0°F. and 120°F. and two laminates at 70°F. The urethane concentration can be determined by the following formula based upon 1 mole of polyester polyol and an NCO:OH ratio of 1:

EXAMPLE 2

Another series of polyester-urethane was prepared and tested in which varying polyesters were used with the preferred low molecular weight diol, 1,4-butanediol and the preferred diisocyanate, Hylene w. The formulations are given in the following Table II which compositions were formulated to provide a urethane content of 15.5 percent in each polyurethane. The impact resistance data is presented in Table III. From the data, it can be seen that the compounds of the invention 2-A, 2-B and 2-K are the only compositions that show comparable penetration resistance at all three temperatures. All of the other compounds were brittle at 0°F. In addition, the compound 2-E was translucent.

TABLE II

| Compound No. (Ingredients) | 2-A | 2-B | 2-C | 2-D | 2-E (MOLE RATIO) | 2-F | 2-G | 2-H | 2-I | 2-J | 2-K |
|---|---|---|---|---|---|---|---|---|---|---|---|
| Poly(1,4-butylene azelate) 1908 MW | 1 | — | — | — | — | — | — | — | — | — | — |
| Poly(1,4-butylene adipate) 1990 MW | — | 1 | — | — | — | — | — | — | — | — | — |
| Poly(ethylene adipate) 2029 MW | — | — | 1 | — | — | — | — | — | — | — | — |
| Poly(ethylene propylene adipate) 1011 MW | — | — | — | 1 | — | — | — | — | — | — | — |
| Poly(1,4-butylene sebacate) 1650 MW | — | — | — | — | 1 | — | — | — | — | — | — |
| Poly(1,5-pentylene sebacate) 2439 MW | — | — | — | — | — | 1 | — | — | — | — | — |
| Poly(1,4-butylene succinate) 1194 MW | — | — | — | — | — | — | 1 | — | — | — | — |
| Poly(1,6-hexylene succinate) 1502 MW | — | — | — | — | — | — | — | 1 | — | — | — |

3,931,113

TABLE II-continued

| Compound No. (Ingredients) | 2-A | 2-B | 2-C | 2-D | 2-E | 2-F | 2-G | 2-H | 2-I | 2-J | 2-K |
|---|---|---|---|---|---|---|---|---|---|---|---|
| | | | | (MOLE RATIO) | | | | | | | |
| Poly(1,5-pentylene succinate) 1385 MW | — | — | — | — | — | — | — | — | 1 | — | — |
| Poly(ethylene succinate) 1385 MW | — | — | — | — | — | — | — | — | — | 1 | — |
| Poly(caprolactone) 1993 MW | — | — | — | — | — | — | — | — | — | — | 1 |
| 1,4-butanediol | 3.442 | 3.910 | 3.737 | 1.250 | 2.810 | 4.74 | 1.696 | 2.45 | 2.165 | 2.165 | 3.649 |
| Hylene W | 4.442 | 4.910 | 4.737 | 2.250 | 3.810 | 5.74 | 2.696 | 3.45 | 3.165 | 3.165 | 4.649 |

TABLE III

| Compound No. | Mean Penetration Velocity (Miles per Hour) | | | |
|---|---|---|---|---|
| | 0°F. | 70°F. | 120°F. | |
| 2-A | (21) 23 | (22) 22 | (21) 18 | (Number of sample in parentheses) |
| 2-B | 26 | 26 | 23 | |
| 2-C | 15 B | 23 | 21 | |
| 2-D | 11 B | 21 | 17 | |
| 2-E | < 10 B | < 13 | < 10 | Hazy-translucent |
| 2-F | 12 B | 17 | 15 | |
| 2-G | < 10 B | 21 | 12 | |
| 2-H | < 16 B | 20 | 18 | |
| 2-I | 10 B | 21 | 20 | |
| 2-J | < 10 B | < 16 B | 12 | |
| 2-K | 21 | 23 | 18 | |

B = Brittle

The following Examples are illustrative of polyester-urethanes which were prepared into sheet form by the preferred procedure.

EXAMPLE 3

A poly(1,4-butylene adipate) polyester (785.6 grams, 0.400 mole) having a molecular weight of 1965, a hydroxyl number of 57 and a melting point of 40° to 60°C. and an acid number of 0.5; and a poly(1,4-butylene adipate) polyester (707.4 grams, 0.698 mole) having a molecular weight of 1014, a hydroxyl number of 111 and an acid number of 0.5 were dried together with agitation in a glass reactor to remove trace amounts of water by heating to 100°–105°C. under 3 millimeters of mercury pressure for about 3 hours. The pressure was released while introducing pre-purified nitrogen and anhydrous 1,4-butanediol, 260.6 grams, (2.892 moles, 0.03% H₂O) was added over a one minute period to the agitated mixture of dried polyesters at 93°C., and the mixture heated to 95°C. in 15 minutes. The resulting mixture was homogeneous. To this homogeneous mixture was added over a one minute period 1046.8 grams (3.989 moles) Hylene W. 4,4'-methylene-bis-(cyclohexyl isocyanate) with a stereoisomer content of 19 to 21 percent trans, trans, 17 to 18 percent cis, cis, and 62 to 64 percent cis, trans, said diisocyanate containing between 0.27 percent and 0.40 percent monoisocyanate, and 0.280 gram (0.01 percent of the total reactants) of dibutyltin dilaurate catalyst. The quantity of diisocyanate was sufficient to provide a urethane content of 16.81 percent in the resultant polymer. The butanediol and diisocyanate were at 22°C. and the additions were both made while the reactor was under a nitrogen atmosphere. The resulting mixture was rapidly agitated for about one minute during which time the temperature of the mixture rose from 80°C. to 95°C. The mixture was poured into a dry Teflon coated reactor which was closed and placed in a 130°C. non-circulating oven continuously purged with nitrogen (the temperature of the polymer was approximately 143°C.) for about 2 hours until the reaction and polyurethane formation was substantially complete. The NCO content of the polymer was 0.07 percent by weight as determined by infrared spectrometry. The resultant semi-solid polymer was allowed to cool to room temperature, removed, cut and milled (front roll 180°F. and rear roll 135°F.) and calendered on a 3 roll mill (top roll 250°F., middle roll 225°;. and bottom roll 215°F.) into 35 mil sheets 14 inches in width. The polymer had an inherent viscosity at 30°C. at a 0.5 percent concentration in N-methyl-2-pyrrolidone of about 1.40 before milling and an NCO content of 0.07 percent. The inherent viscosity after calendering was approximately the same (1.41).

EXAMPLE 4

In accordance with the general procedure and conditions of Example 1, a poly(1,4-butylene adipate) polyester (2.274 moles) having a molecular weight of 1010 and a hydroxyl number of 111.1 was mixed with a poly(1,4-butylene adipate) (1.295 moles) having a molecular weight of 1965 and a hydroxy number of 57.1 to which agitated mixture of dried polyester was added first 7.23 moles of 1,4-butanediol and then 9.99 moles of 4,4'-methylene-bis-(cyclohexyl isocyanate) (Hylene W) and the mixture was heated to 80°C. The quantity of diisocyanate was sufficient to provide a urethane content of 16.81 percent in the resultant polymer. No catalyst, however, was added and the homogeneous mass was heated at an oven temperature between about 122° and 129°C. for 19 hours. The resultant polymer had an inherent viscosity at 30°C. at a 0.5 percent concentration in N-methyl-2-pyrrolidone of about 0.79, and an NCO content of 0.1 percent by weight. The inherent viscosity remained unchanged after calendering. The front roll temperature of the mill was 180°F. and the rear roll 135°F. The top roll of the calender was 150°F., the middle roll 135°F., and the bottom roll 125°F.

In Examples 5 through 27, the polyurethanes were prepared from the specified materials in the indicated molar ratio following the general procedure and conditions of Example 3 except no catalyst was used and in Examples 24 through 27 the diisocyanate which was added was at a temperature of about 60°C. The water content reported in Examples 24 through 27 is the amount of water in the combined hydroxyl terminated reactants. Inherent viscosities of the prepared polyurethanes were taken at 30°C. at a 0.5 percent concentration in N-methyl-2-pyrrolidone for Examples 5 through 12 and in silica stabilized chloroform, for examples 13 through 27. The NCO content was determined by infrared spectrometry.

EXAMPLE 5

1 mole poly(1,4-butylene adipate) M.W. 1014, OH No. 110.7, Acid No. 0.5
0.905 mole of 1,4-butanediol
1.905 moles Hylene W
Reaction time: 19 hours at an oven temperature of 130°C.
Inh. V. 1.21, NCO 0.1%; urethane content 14.09%

EXAMPLE 6

1 mole poly(1,4-butylene adipate) M.W. 1965, OH No. 57.1, Acid No. 0.5
3.26 moles 1,4-butanediol
4.26 moles Hylene W
Reaction time: 24 hours at an oven temperature of 130°C.
Inh. V. 0.78, NCO 0.03%; urethane content 14.88%

EXAMPLE 7

1 mole poly(1,4-butylene adipate) M.W. 1965, OH No. 57.1, Acid No. 0.5
2.34 moles of 1,4-butanediol
3.34 moles of Hylene W
Reaction time: 19 hours at an oven temperature of 130°–131°C.
Inh. V. 1.03, 0.07% NCO; urethane content 12.91%

EXAMPLE 8

1 mole poly(1,4-butylene adipate) M.W. 1965, OH No. 57.1, Acid No. 0.5
3.40 moles 1,4-butanediol
4.40 moles Hylene W
Reaction time: 23¾ hours at an oven temperature of 129°–130°C.
Inh. V. 1.06, 0.1% NCO; urethane content 15.6%

EXAMPLE 9

1 mole poly(1,4-butylene adipate) M.W. 1965, OH No. 57.1, Acid No. 0.5
3.11 moles 1,4-butanediol
4.11 moles Hylene W
Reaction time: 19.5 hours at an oven temperature of 128°–130°C.
Inh. V. 0.84; urethane content 14.59%

EXAMPLE 10

1 mole poly(1,4-butylene adipate) M.W. 1965, OH No. 57.1. Acid No. 0.5
2.71 moles 1,4-butanediol
3.71 moles Hylene W
Reaction time: 19 hours at an oven temperature of 130°–131°C.
Inh. V. 0.88; urethane content 13.76%

EXAMPLE 11

1 mole poly(1,4-butylene adipate) M.W. 1965, OH No. 57.1, Acid No. 0.5
3.26 moles 1,4-butanediol
4.26 moles Hylene W
Reaction time: 20 hours at an oven temperature of 130°C.
Inh. V. 1.02, NCO 0.1%; urethane content 14.88%

EXAMPLE 12

1 mole poly(1,4-butylene adipate) M.W. 1965, OH No. 57.1, Acid No. 0.5
3.61 moles 1,4-butanediol
4.61 moles Hylene W
Reaction time: 18 hours at an oven temperature of 130°C.
Inh. V. 0.72, NCO 0.07%; urethane content 15.56%

The following compositions of Examples 13–27 were heated in a 143°C. circulating air oven for 20 hours.

EXAMPLE 13

1 mole poly(1,4-butylene adipate) M.W. 2011, OH No. 55.8, Acid No. 0.48
1.784 moles poly(1,4-butylene adipate) M.W. 1012, OH No. 110.9, Acid No. 0.51
8.385 moles 1,4-butanediol
11.169 moles Hylene W; urethane content 17.57%
NCO 0.07%; Inh. V. 1.18

EXAMPLE 14

1 mole poly(1,4-butylene adipate) M.W. 1989, OH No. 56.4, Acid No. 0.38
1.767 moles poly(1,4-butylene adipate) M.W. 1012, OH No. 110.9 Acid No. 0.51
4.257 moles 1,4-butanediol
7.024 moles Hylene W
Inh. V. of polymer 0.87 at 0.5% concentration in chloroform at 30°C.; urethane content 13.81%; NCO 0.03%

EXAMPLE 15

1 mole poly(1,4-butylene adipate) M.W. 1989, OH No. 56.4, Acid No. 0.38
1.767 moles poly(1,4-butylene adipate) M.W. 1012, OH No. 110.9, Acid No. 0.51
5.474 moles 1,4-butanediol
8.241 moles Hylene W
Inh. V. of polymer 1.25 at 0.5% concentration in chloroform at 30°C.; urethane content 15.12%; NCO 0.10%

EXAMPLE 16

1 mole poly(1,4-butylene adipate) M.W. 1989, OH No. 56.4, Acid No. 0.38
1.767 moles poly(1,4-butylene adipate) M.W. 1012, OH No. 110.9, Acid No. 0.51
6.291 moles 1,4-butanediol
9.058 moles Hylene W
Inh. V. of polymer 1.08 at 0.5% concentration in chloroform at 30°C.; urethane content 15.90%; NCO 0.06%

EXAMPLE 17

1 mole poly(1,4-butylene adipate) M.W. 1989, OH No. 56.4, Acid No. 0.38
2.737 moles 1,4-butanediol
3.737 moles Hylene W Inh. V. of polymer 1.10 at 0.5% concentration in chloroform at 30°C; urethane content 13.64%; NCO 0.04%

EXAMPLE 18

1 mole poly(1,4-butylene adipate) M.W. 2011, OH No. 55.8, Acid No. 0.48
2.150 moles 1,4-butanediol
3.150 moles Hylene W
Inh. V. of polymer 1.21 at 0.5% concentration in chloroform at 30°C.; urethane content 12.26%; NCO 0.02%

EXAMPLE 19

1 mole poly(1,4-butylene adipate) M.W. 1012, OH No. 110.9, Acid No. 0.51
1.205 moles 1,4-butanediol
2.205 moles Hylene W
Inh. V. of polymer 0.98 at 0.5% concentration in chloroform at 30°C.; urethane content 15.31%; NCO 0.09%

EXAMPLE 20

1 mole poly(1,4-butylene adipate) M.W. 1012, OH No. 110.9, Acid No. 0.51
0.904 mole 1,4-butanediol
1.904 moles Hylene W
Inh. V. of polymer 1.03 at 0.5% concentration in chloroform at 30°C.; urethane content 14.10%; NCO 0.09%

EXAMPLE 21

1 mole poly(1,4-butylene adipate) M.W. 1012, OH No. 110.9, Acid No. 0.51
0.640 mole 1,4-butanediol
1.640 moles Hylene W; urethane content 12.89%; NCO 0.07%

EXAMPLE 22

1 mole poly(1,4-butylene adipate) M.W. 2010, OH No. 55.8, Acid No. 0.5
2.354 moles 1,4-butanediol
3.356 moles 4,4'-isopropylidene bis-(cyclohexyl isocyanate) in a stereoisomer ratio of 77.5 percent trans and 22.5 percent cis; urethane content 12.4%; NCO 0.06%; Inh. V. .78

EXAMPLE 23

1 mole poly(propylene adipate), M.W. 1944, OH No. 57.7, Acid No. 0.45
2.93 moles 1,4-butanediol
2.36 moles Hylene W
1.57 moles toluene diisocyanate of 80% 2,4- and 20% 2,6- isomers; urethane content 14.7%; NCO 0.05%; Inh. V. 1.69

EXAMPLE 24

1 mole poly(1,4-butylene adipate) M.W. 2010, OH No. 55.8, Acid No. 0.40
2.149 moles 1,3-butanediol
3.180 moles Nacconate H-12
Urethane content 12.35%; water content 291 ppm; 0.02% NCO; Inh. V. 1.3

EXAMPLE 25

1 mole poly(1,4-butylene adipate) M.W. 2010, OH No. 55.8, Acid No. 0.40
2.763 moles 1,3-butanediol
3.785 moles Nacconate H-12
Urethane content 13.73%; water content 252 ppm; < 0.01% NCO;
Inh. V. 0.94

EXAMPLE 26

1 mole poly(1,4-butylene adipate) M.W. 2010, OH No. 55.8, Acid No. 0.40
3.175 moles 1,3-butanediol
4.217 moles Nacconate H-12
Urethane content 14.62%; water content 371 ppm; 0.01% NCO
Inh. V. 1.3

EXAMPLE 27

1 mole poly(1,4-butylene adipate) M.W. 2010, OH No. 55.8, Acid No. 0.40
3.786 moles 1,3-butanediol
4.832 moles Nacconate H-12
Urethane content 15.76%; water content 348 ppm; 0.01% NCO
Inh. V. 1.4

The Gehman moduli taken two days after molding for some of the preferred compositions are given below and compared with plasticized polyvinyl butryal.

| Ex. No. | Log of 3 Times the Shear Modulus In Dynes per Cm² | | | | |
|---|---|---|---|---|---|
| | −20°C. | 0°C. | 23°C. | 50°C. | 100°C. |
| 13 | 9.45 | 8.92 | 8.09 | 7.84 | 7.53 |
| 14 | 8.02 | 7.84 | 7.81 | 7.40 | 6.90 |
| 16 | 9.00 | 8.53 | 8.26 | 7.87 | 7.49 |
| 19 | 8.02 | 7.87 | 7.53 | 7.46 | 6.58 |
| 10 | 8.27 | 8.13 | 8.02 | 7.85 | 7.60 |
| PVB | 10.25 | 9.70 | 8.25 | 7.20 | 7.63 |

It can be seen from the data that the preferred compositions have a relatively constant modulus in the leathery region at various temperatures, whereas the polyvinyl butryal composition is out of the leathery region at both −20° and 50°C. and is not relatively constant at the other two intermediate temperatures.

The Example compositions meet the minimum light transmittance and haze requirements of the automobile code (ANSI Code Z-261 1966 Test No. 18).

Safety glass laminates were prepared employing as interlayers the compositions of Examples 3–27 and a commercial polyvinyl butyral polymer. The laminates which measured 12 inches by 12 inches employed glass sheets having a thickness of ⅛-inch and were formed by placing the interlayers (30 – 46 mils) between two glass sheets and the laminates subjected to a temperature of 275°–350°F. and 200 p.s.i. for 45 minutes in an autoclave. Laminates were aged for one week at room temperature and then subjected to the impact resistance test as described supra. The test results are shown in the following Table IV:

TABLE IV

| Interlayer Example No. | Interlayer Thickness Inches | Autoclave Temperature (°F.) | Mean Penetration Velocity (MPH) 0°F | 70°F. | 120°F. |
| --- | --- | --- | --- | --- | --- |
| 3 | .034 – .037 | 275 | 34, >35 | 34 | 25 |
| 4 | .030 – .036 | 350 | 17 | 37 | 31 |
| 5 | .032 – .034 | 275 | >37 | 34 | 24 |
| 6 | .037 – .042 | 275 | 36 | 32 | 21 |
| 7 | .027 – .032 | 275 | 37 | 31 | 22 |
| 8 | .032 – .037 | 275 | 34, >37 | 34 | 22 |
| 9 | .032 – .035 | 350 | 35 | 32 | 27 |
| 10 | .033 – .036 | 350 | >37 | 32 | 25 |
| 11 | .027 – .033 | 275 | >37 | 31 | 27 |
| 12 | .032 – .036 | 275 | 23 | 36 | 30 |
| 13 | .030 | 275 | 22 | 35 | 26 |
| 14 | .031 – .035 | 275 | 33 | 27 | 19 |
| 15 | .029 | 275 | 36 | 34 | 23 |
| 16 | .030 – .037 | 275 | 31 | 36 | 28 |
| 17 | .032 – .034 | 275 | 36 | 30 | 23 |
| 18 | .033 – .034 | 275 | > 37 | 29 | 22 |
| 19 | .034 – .036 | 275 | Brittle | 36 | 25 |
| 20 | .031 – .034 | 275 | 29 | 30 | 21 |
| 21 | .030 | 275 | >35 | 30 | 18 |
| 22 | .030 | 275 | 31 | 28 | 19 |
| 23 | .028 – .035 | 275 | >27 | 32 | 18 |
| 23 | .029 – .032 | 275 | 22 | 29 | 19 |
| 24 | .030 | 275 | 35 | 27 | 16 |
| 25 | .030 | 275 | 28 | 28 | 17 |
| 26 | .030 | 275 | 31 | 27 | 20 |
| 27 | .030 | 275 | 26 | 30 | 20 |
| PVB | .028 – .032 | 275 | 16 | 24 | 13 |

From the Table, it can be seen that the compositions of the invention can be used effectively as interlayers. They are effective over a broad temperature range and are generally superior to the commercial polyvinyl butyral interlayer. Further, it can be seen by varying the concentration of the reactants that a composition can be prepared for a particular use and temperature.

In order to test for laceration severity, sled tests were conducted [see, for example, "Eleventh STAPP Car Crash Conference" proceeding published by the Society of Automotive Engineers, Inc., New York, New York (1967, page 143)]. These tests consist of propelling a dummy of average weight (having a head covered with a double layer of moist chamois) at various speeds into a laminated safety glass maintained at various temperatures, and the extent of chamois tear after impact noted. The windshields are mounted in a frame at an angle of 70° using adhesive glazing similar to most domestic commercial production mountings. A laceration rating is assigned by the following method. Surface lacerations to the outer layer of the chamois only are classed as "minor" and giving an injury rating of 1. Deep lacerations through both layers of the chamois are considered as "serious" and given an injury rating of 5. Intermediate degrees of damage to the chamois are rated 2, 3 or 4, depending upon the severity of damage.

A factor known as the Severity Index has become identified with relative safety of the windshields determined by impact tests using the 50th percentile Alderson dummy covered with two layers of moist chamois on the test sled apparatus. The Severity Index (S.I.) is calculated by the formula:

$$S.I. = \int A^{2.5} dt,$$

where $A$ is deceleration in units of gravity and $dt$ is the time differential in milliseconds between the moment of impact of the head of the dummy with the test windshield to the time a horizontal accelerometer mounted within the dummy head indicates a sudden negative load. This value is determined for each millisecond during the time interval and the values integrated for the whole time period. In other words, the Severity Index is calculated from the area under a curve resulting from a plot of acceleration acting on the dummy head raised to the $2.5$ power as a function of time. In general, the Severity Index increases with velocity of impact.

The test results for the windshields employing a composition prepared by the procedure of Example 17 and the commercial polyvinyl butyral composition as the interlayers are shown in Table V. The interlayers were approximately 30 mils thick and the float glass ⅛ inch. The windshields were heated in an autoclave for 45 minutes at 275°F. and 200 p.s.i.g.

The preferred polyurethanes provide windshields with severity indices less than 1,000 when the windshield is not penetrated by the dummy and an inner glass sheet is impacted at a velocity of 25 miles per hour by the Alderson dummy of average weight (162–165 lbs.) while the windshield is maintained at a temperature of 30°, 75° or 110°F. and the total length of polyurethane tear is less than about 5 inches, and the laceration rating not more than 3.

TABLE V

| | | | (Sled Impact Test Results) P = Penetration | | | |
| --- | --- | --- | --- | --- | --- | --- |
| Interlayer | Windshield Temp. (°F.) | Velocity of Dummy, at Impact (m.p.h.) | of Windshield H = Held | Total Length of Interlayer Tear (Inches) | Laceration Rating | Severity Index |
| Composition of Example 17 | 30 | 25.6 | H | 0 | 1 | 807 |
| | 75 | 25.6 | H | 0 | 2 | 485 |
| | 75 | 30.8 | H | 0 | 2 | 918 |
| | 110 | 24 | H | 1 | 3 | 476 |
| PVB | 30 | 25 | H | 16 | — | 860 |

TABLE V-continued

| | | (Sled Impact Test Results) | | | | |
|---|---|---|---|---|---|---|
| Interlayer | Windshield Temp. (°F.) | Velocity of Dummy, at Impact (m.p.h.) | P = Penetration of Windshield H = Held | Total Length of Interlayer Tear (Inches) | Laceration Rating | Severity Index |
| | 75 | 25 | H | 8 | 2 – 3 | 441 |
| | 110 | 20 | H | 16 | — | 330 |

PVB is a commercial poly(vinyl butyral) interlayer

From the data reported in the Table, it can be seen that the composition of the invention is effective over a wide temperature range and is superior to the PVB interlayer at high impact velocities as evidenced by the low laceration ratings, limited amount of interlayer tear and low severity indices. The low severity indices for PVB are meaningless in view of the extensive interlayer tear. In addition to the reported data, the composition of the invention stretched to a considerable extent absorbing energy so as to prevent or minimize concussion injury, and also adhered well to the glass inhibiting scattering of broken glass particles.

The following Examples are illustrative of bilayer laminates wherein the composition of the invention is adhered to a single layer of glass.

EXAMPLES 28–30

Three polyurethanes prepared by the procedure and proportions of Example 3 except that no catalyst was used, were sandwiched between two glass sheets (annealed float glass or thermally tempered plate glass as indicated) one of which glass sheets was covered on the interface with a release material of 1-mil thick TEDLAR film and the other was treated on the interface with an adhesion promoter of 1 percent solution by weight N-(beta amino ethyl) gamma amino propyltrimethoxysilane in isopropyl alcohol and water. The solvent solution was prepared from 250 milliliters of isopropanol and 195 milliliters water from which a 99 gram portion was taken and mixed with 1 gram of silane. A portion of this adhesion promoter was then sprayed on the glass sheet and allowed to air dry at room temperature. The sandwich was then subjected to a temperature between 275°F. and 350°F. at 200 pounds per square inch pressure for 45 minutes in an autoclave. The laminates were then subjected to a 22 lb. headform dropped on the plastic side and the results are shown in the following Table VI.

The poly(urethanes) of the invention have excellent optical properties and are clear and exhibit excellent transmission to visible light. They generally have inherent viscosities at 30°C. in 0.5 percent solution of silica stabilized chloroform or N-methyl-2-pyrrolidone of between about 0.8 and about 1.6.

In addition, the poly(ester-urethanes) can be characterized by their urethane (HNCOO) concentration. Polyurethanes for this invention will generally have a urethane content between about 13 and about 16, preferably between 13.5 and 15.5 percent by weight with polyols having a molecular weight of 1,000, and between about 12 and about 18, preferably between 13.5 and 17 percent by weight with an optimum of about 13.71 percent by weight for the polyols of 2,000 molecular weight.

The urethanes of the invention can be characterized as thermoplastic or plastomers, that is, they are elastoplastic and thus do not snap back as a true elastomer when stressed. In addition, they are clear, flexible and essentially non-adhesive at room temperature. They can also be described as being leathery and generally have a relatively constant Gehman modulus between about −20° and 50°C. of $10^7$ and $10^{9.5}$, log of 3 times the shear modulus in dynes per cm.$^2$, as measured according to ASTM-D 1053-65.

The polyurethanes of the invention will generally have an average molecular weight as calculated from inherent viscosity measurements between about 10,000 and about 100,000 and preferably between about 20,000 and 65,000. In addition, the optically clear polyurethanes upon heating will generally exhibit a low temperature endotherm at about 70°C. (differential thermal analysis can be made with a duPont 900 Thermal Analyzer) and generally no endotherm or exotherm occurs between 100° and 170°C. indicating that the polymer is amorphous. Softening points of about 170°C., melting points of about 220°C. and decomposition at about 270°C. are typical. The compositions are suitable for use in automobile windshields and meet the standard requirements of minimum light transmission of 70 percent and preferably 86.5 percent or above

TABLE VI

Severity Index - Penetration Resistance - Lacerative Injury
Using 22 Lb. Headform on 24″ × 36″ Panels, Temperature During
Testing 75°F., Impact Angle 35° Off Horizontal

| Example No. | Laminate Configuration | Speed at Impact (miles per hour) | Severity Index | Inner Liner Tear in Inches | Lacerative Injury |
|---|---|---|---|---|---|
| 28 | 0.030″ polyurethane- ⅛″ thermally tempered plate glass | 26.2 | 336 | 0 | 1 |
| 29 | 0.030″ polyurethane- ⅛″ thermally tempered plate glass | 26.8 | 356 | 0 | 1 |
| 30 | 0.030″ polyurethane- ⅛″ annealed float glass | 26.2 | 576 | 3 | 1 |

(Illuminant A, Tungsten Lamp 2,840° K) and less than 2 percent haze on an abraded specimen (ANSI Code Z-26.1, 1966, Test No. 18). The percent light transmission and percent haze can be measured by the Hunter Pivotable Haze Meter.

It is believed that the polyester-urethanes of the invention have segments principally of $(ACBC)_x$ wherein A is the polyester, B is the low molecular weight diol of less than 250, C is the cycloaliphatic diisocyanate and $x$ is an integer. There is believed to be a small number of BC segments which are joined together to provide hard segments, and there is believed to be a smaller number of AC segments. When the preferred ratio of reactants is employed of 0.9 to 1.2 moles of low molecular weight diol per mole of 1,000 MW polyester, the number of BC and AC units should be about equal. When the preferred ratio of reactants are employed of 0.7 to 5 moles of low molecular weight diol per mole of 2,000 MW polyester, then the number of BC units is 0.7 to 5 times as great as the number of AC units.

In addition, the trans, trans stereoisomer of the diisocyanate is more reactive with the aforesaid hydroxyl-terminated reactants than the cis, trans or cis, cis isomers and consequently blocks from the same isocyanate stereoisomer may appear in the AC and BC segments.

Further, hydrogen bonding is believed to occur between the hydrogen atoms of the urethane groups and the carbonyl groups of the urethane group in another molecule, or the carbonyl groups of the polyester. This is believed to impart desirable strength to the polyester-urethane but because the hydrogen bonds are believed to be broken at elevated temperature, the polyester-urethanes of the invention are easily processible. When allowed to return to ambient temperature, the bonds are believed to be reformed so as to again impart strength or impact resistance to the plastomeric polyester-urethane.

It is believed that if too many BC segments are joined together, a translucent polymer results. This may occur when a prepolymer is formed of the diisocyanate and low molecular weight diol, and the prepolymer reacted with a polyester.

When used in the appended claims, the use of the term "transparent" in connection with polyester-urethane refers to a polyester-urethane glass laminate having a minimum light transmission of 70 percent and less than 2 percent haze on an abraded specimen as determined by A.N.S.I. Code Z 26.1, 1966, Test No. 18, when the urethane is sandwiched between two glass sheets.

Mean penetration velocity as used in the appended claims is the average velocity at which a 5 pound free-falling 3¼ -inch diameter steel ball will just pass through a laminate made up of a polyester-urethane interlayer sandwiched between two sheets of ⅛th inch thick 12-inch by 12-inch float glass to form a laminate with the laminate held rigid, the polyester-urethane sheet approximately 0.030 inch thick and the laminate maintained at a temperature of 0°F., 70°F., or 120°F. The term "sheet" encompasses not only pre-formed polyurethane but also cast-in-place or a polyurethane layer achieved by any means.

Although the present invention has been described with reference to the specific details of particular embodiments thereof, it is not intended thereby to limit the scope of the invention, except insofar as the specific details are recited in the appended claims.

We claim:

1. A transparent, thermoplastic polyesterurethane that is the reaction product of (a) essentially linear hydroxy-terminated polyester selected from the group consisting of poly(1,4-butylene adipate) having a molecular weight of about 2000, poly(1,4-butylene azelate) having a molecular weight of from about 1000 to about 2000 and poly(epsilon caprolactone) having a molecular weight of from about 1000 to about 2000, (b) aliphatic diol of from 2 to 10 carbon atoms, and (c) 4,4'-methylene-bis(cyclohexyl isocyanate), the mole ratio of (b) to (a) ranging from about 0.9 to 1.2:1 for polyesters of about 1000 molecular weight to from about 0.7 to 5:1 for polyesters of about 2000 molecular weight, and the number of isocyanate groups provided by (c) being substantially equivalent to the total number of hydroxy groups provided by (a) and (b) whereby to provide a polyesterurethane that is substantially free of unreacted isocyanate groups.

2. The polyesterurethane of claim 1 wherein the aliphatic diol is selected from the group 1,4-butanediol, 1,3-butanediol, 1,5-pentanediol, and 1,6-hexanediol.

3. The polyesterurethane of claim 1 wherein the diisocyanate has a stereoisomer content of 19 to 21 percent trans, trans, 17 to 18 percent cis, cis, and 62 to 64 percent cis, trans.

4. The polyesterurethane of claim 1 wherein the diisocyanate has a stereoisomer ratio of 70 percent total trans and 30 percent total cis.

5. The polyesterurethane of claim 1 wherein the aliphatic diol is a symmetrical diol when the trans, trans isomer content of the diisocyanate is less than 30 percent and the aliphatic diol is unsymmetrical when the trans, trans isomer content of the diisocyanate is more than 30 percent.

6. The polyesterurethane of claim 1 wherein the urethane content is between 13 and 16 percent.

7. A transparent, thermoplastic polyesterurethane that is the reaction product of (a) essentially linear, hydroxy-terminated polyester selected from the group consisting of poly(1,4-butylene azelate) and poly(epsilon caprolactone), said polyester having a molecular weight of about 1000, (b) aliphatic diol of from 2 to 10 carbon atoms, and (c) 4,4'-methylene-bis(cyclohexyl isocyanate), the mole ratio of (b) and (a) being from about 0.9 to 1.2:1 and the number of isocyanate groups provided by (c) being substantially equivalent to the total number of hydroxy groups provided by (a) and (b) whereby to provide a polyesterurethane that is substantially free of unreacted isocyanate groups.

8. The polyesterurethane of claim 7 wherein the aliphatic diol is 1,4-butane diol.

9. The polyesterurethane of claim 7 wherein the aliphatic diol is a symmetrical diol when the trans, trans isomer content of the diisocyanate is less than 30 percent and the aliphatic diol is unsymmetrical when the trans, trans isomer content of the diisocyanate is more than 30 percent.

10. The polyesterurethane of claim 8 wherein the diisocyanate has a stereoisomer content of 19 to 21 percent trans, trans, 17 to 18 percent cis, cis, and 62 to 64 percent cis, trans.

11. The polyesterurethane of claim 7 wherein the urethane content is between 13 and 15 percent.

12. A transparent, thermoplastic polyesterurethane that is the reaction product of (a) essentially linear hydroxy-terminated polyester selected from the group consisting of poly(1,4-butylene adipate) and poly(1,4-butylene azelate), said polyester having a molecular weight of about 2000, (b) aliphatic diol of from 2 to 10 carbon atoms, and (c) 4,4'-methylene-bis(cyclohexyl isocyanate), the mole ratio of (b) to (a) being from about 0.7 to 5:1 and the number of isocyanate groups provided by (c) being substantially equivalent to the total number of hydroxy groups provided by (a) and (b) whereby to provide a polyesterurethane that is substantially free of unreacted isocyanate groups.

13. The polyesterurethane of claim 12 wherein the aliphatic diol is 1,4-butanediol.

14. The polyesterurethane of claim 12 wherein the aliphatic diol is a symmetrical diol when the trans, trans isomer content of the diisocyanate is less than 30 percent and the aliphatic diol is unsymmetrical when the trans, trans isomer content of the diisocyanate is more than 30 percent.

15. The polyesterurethane of claim 12 wherein the diisocyanate has a stereoisomer content of 19 to 21 percent trans, trans, 17 to 18 percent cis, cis, and 62 to 64 percent cis, trans, the aliphatic diol is 1,4-butanediol, and the polyester is poly(1,4-butylene adipate).

16. The polyesterurethane of claim 12 wherein the urethane content is between 12 and 18 percent.

* * * * *